United States Patent
Morillon

(10) Patent No.: US 6,621,178 B2
(45) Date of Patent: Sep. 16, 2003

(54) MOTOR VEHICLE EQUIPPED WITH A SELECTIVE SO-CALLED "HANDS-FREE" ACCESS SYSTEM

(75) Inventor: Jacques Morillon, Massy (FR)

(73) Assignee: Valeo Securite Habitacle, Creteil (FR)

( * ) Notice: Subject to any disclaimer, the term of this patent is extended or adjusted under 35 U.S.C. 154(b) by 147 days.

(21) Appl. No.: 09/731,720

(22) Filed: Dec. 8, 2000

(65) Prior Publication Data

US 2001/0003405 A1 Jun. 14, 2001

(30) Foreign Application Priority Data

Dec. 10, 1999 (FR) .............................. 99 15581

(51) Int. Cl.⁷ .............................................. H01H 47/00
(52) U.S. Cl. ...................... 307/10.5; 307/9.1; 307/10.1; 340/325.31
(58) Field of Search ............... 307/10.6, 10.5, 307/10.1, 9.1; 346/825.31

(56) References Cited

U.S. PATENT DOCUMENTS 5,600,323 A * 2/1997 Boschini .................... 341/173
5,973,611 A * 10/1999 Kulha et al. ........... 340/825.31

FOREIGN PATENT DOCUMENTS

| DE | 19718764 | * | 8/1998 | ............ G07C/9/00 |
| DE | 19748327 | | 5/1999 | |
| DE | 19835155 | | 2/2000 | |

* cited by examiner

*Primary Examiner*—Brian Sircus
*Assistant Examiner*—Robert L. DeBeradinis
(74) *Attorney, Agent, or Firm*—Liniak, Berenato & White

(57) ABSTRACT

In this vehicle, equipped with a recognition device (1) capable of remotely exchanging data with an identification member (11) worn or carried by a user to allow access to the vehicle when the identification member has been authenticated by the recognition device, the latter being connected to a pair of lateral antennas (2, 3) each having, when powered at nominal power, a zone of coverage encompassing the interior of the vehicle and extending laterally on both sides thereof to allow a dialog between the recognition device and the identification member when the latter is located in the zone of coverage of at least one of the antennas, the recognition device (1) is capable, in response to action by the user on an external member placed on one side of the vehicle, of causing the antenna located on the same side as the external member to be powered at nominal power and of causing the antenna located on the opposite side of the vehicle to be powered at a reduced power so that the latter antenna has a reduced zone of coverage (Z'1).

5 Claims, 1 Drawing Sheet

MOTOR VEHICLE EQUIPPED WITH A SELECTIVE SO-CALLED "HANDS-FREE" ACCESS SYSTEM

The present invention relates to a motor vehicle equipped with a so-called "hands-free" access system.

In a system such as this, a recognition device, sometimes also known as an identification device, is installed on the vehicle to operate the means for locking the doors or other opening leaves of the vehicle, this recognition device being capable of remotely exchanging data with an identification member, sometimes also called an "identifier", worn or carried by a user to allow access to the vehicle when the identification member has been authenticated by the recognition device. To allow dialog between the recognition device and the identification member, several antennas are generally distributed around the periphery of the vehicle so as to detect the presence of the identification member outside the vehicle. Such antennas are, for example, arranged in the external rear-view mirrors, the door handles, the door posts, etc. When the user has commanded locking of the doors of the vehicle, for example by pressing a button provided for this purpose on the external door handle and has moved away from the vehicle, the system automatically locks the doors and other opening leaves of the vehicle as soon as the user wearing or carrying the identification member has left the zone of coverage of said external antennas.

Furthermore, such a system can also inhibit vehicle engine electronic immobilizer devices when somebody equipped with an identification member giving him clearance to drive the vehicle is inside the cabin of the vehicle. In this case, the antennas are arranged, for example, on the dashboard, in the seats of the vehicle or on the interior walls of the doors.

However, the number of antennas to be fitted in the vehicle becomes high, which increases the cost and time taken to fit the system in the vehicle.

This is why the current Applicant Company has already proposed a motor vehicle equipped with a so-called "hands-free" access system of the abovementioned kind comprising at least one pair of antennas placed one along each side of the vehicle, the two antennas having a common zone of coverage covering the interior of the vehicle so that the recognition device is capable of detecting the presence of an identification member in said common zone of coverage when said pair of antennas receives a signal from that same identification member, each antenna of said pair of antennas also having its own zone of coverage outside the vehicle so that the recognition device is capable of detecting the presence of an identification member in one of the two individual zones of coverage when the associated antenna is the only one to receive a signal from the identification member.

However, in order to achieve a range of the order of 2 m outside the vehicle, it is sometimes necessary to power the antennas with a relatively high nominal electrical power. This is the case in particular when the antennas are fitted inside the cabin, for example in the internal lining of the door posts. When this is the case, it may be that when the recognition device sends out an interrogation signal via the two antennas, the zone of coverage of each antenna, that is to say the zone in which they can detect an identification member worn or carried by a user, extends on each side of the vehicle as illustrated in FIG. 1 of the attached drawings.

Reference is made to this FIG. 1. This shows a vehicle V equipped with a so-called "hands-free" access system which comprises a recognition device 1 connected to two antennas 2 and 3 arranged one on the right-hand side and one on the left-hand side of the vehicle V, for example in the internal linings of the B-pillars 4 and 5 located respectively between the right-hand doors 6 and 7 and between the left-hand doors 8 and 9 of said vehicle. FIG. 1 also depicts, in dashed line, the zones of coverage Z1 and Z2 of the two antennas 2 and 3 when they are powered at nominal power. Each of the two zones extends on both sides of the vehicle V. In consequence, if the user wearing or carrying an identification member 11 is in the position depicted in FIG. 1, near the antenna 3, he is detected both by the antenna 3 and by the antenna 2. This may be troublesome if there is a desire to have selective detection of the identification number 11 according to whether it is located on one side of the vehicle V or the other. Such selectivity is advantageous because it makes it possible, when the antenna 2 located on the right-hand side or passenger side detects an authorized user approaching the vehicle from this side, to cause, for example, the unlocking of the locks of the doors on just the passenger side, and when the antenna 3 located on the left-hand side or the driver side detects an authorized driver of the vehicle approaching the latter from the driver side, to bring about the unlocking of the locks of the doors only on the driver side (or both sides) and, in addition, other functions such as preheating the engine in the case of a diesel engine, for example.

In order to overcome this problem of selectivity, the electrical power of the signal supplied to the antennas 2 and 3 could be reduced so as to reduce their range or zone of coverage so that each antenna radiated to the outside of the vehicle V only on the side of the antenna concerned. However, such a solution would obviously lead to a significant and undesired reduction in the range of each antenna toward the outside of the motor vehicle.

The object of the present invention is therefore to provide a solution to the aforementioned problem of selectivity in the case where the zone of coverage or detection zone of each of the two antennas extends on both sides of the motor vehicle.

To this end, the present invention provides a motor vehicle equipped with a recognition device for operating means for locking the opening leaves of the motor vehicle, said recognition device being capable of remotely exchanging data with an identification member worn or carried by a user, to allow access to the vehicle when the identification member has been authenticated by the recognition device, the latter being connected to a pair of antennas placed one along each side of the vehicle and each having, when powered at nominal power, a zone of coverage which covers the interior of the cabin of the vehicle and extends laterally to the outside at least on the side on which the antenna is located, so as to allow a dialog between the recognition device and the identification member when the latter is located in the zone of coverage of at least one of said antennas, wherein the recognition device is capable, in response to the action of the user on an external member placed on one side of the vehicle, of causing the antenna located on the same side as said external member to be powered at said nominal power and the antenna located on the opposite side of the vehicle to be powered at a reduced power so that the latter antenna has a reduced zone of coverage extending toward the outside of the vehicle only on said side opposite the one on which this antenna is located.

In consequence, only the antenna which is powered at nominal power and which is located on the same side as the external member on which the user has acted will be capable of detecting the possible presence of an authorized identification member outside the vehicle on the same side as said external member on which the user has acted.

As a preference, the powering of one of the two antennas at nominal power and the powering of the other antenna at reduced power are offset in time.

As a preference, the pair of antennas is placed approximately in the middle of the sides of the vehicle.

For example, said pair of antennas may be installed in the door handles or in the B-pillars of the vehicle bodywork.

Said external member may be an external door handle or pushbutton on which the user acts to request the locking or unlocking of the door locks.

Other features and advantages of the invention will become more apparent in the course of the following description of one embodiment of the invention given by way of example with reference to the attached drawings in which.

Figure 1:
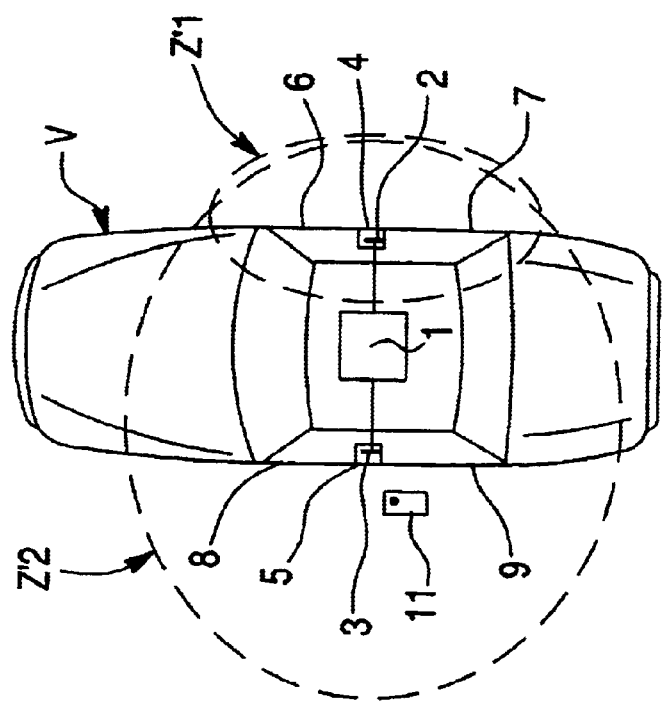
FIG. 1 is a view from above of a vehicle equipped with a so-called "hands-free" access system known in the prior art.
Figure 2:
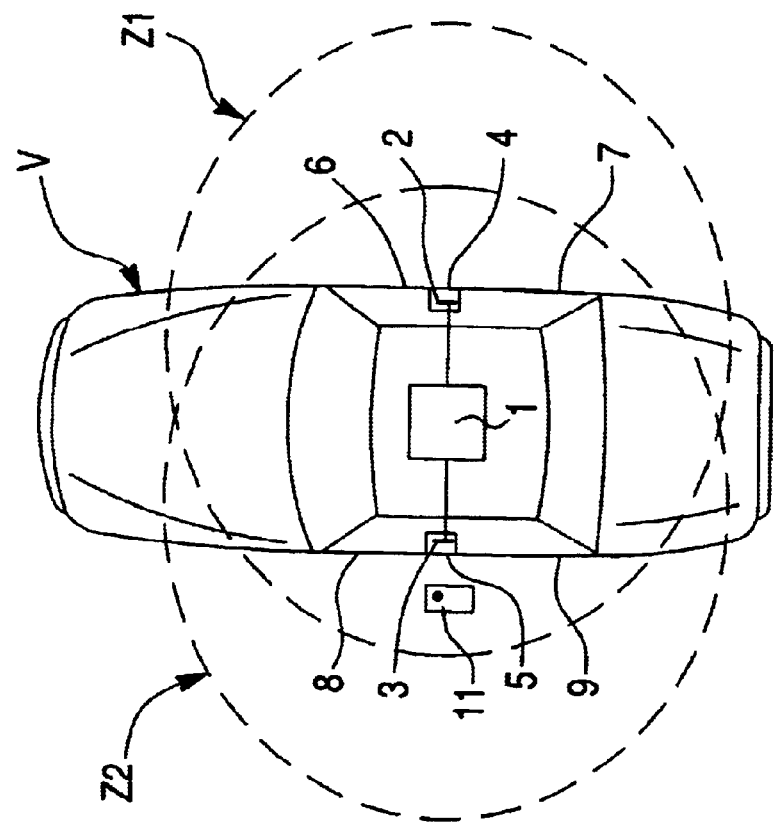
FIG. 2 is a view similar to FIG. 1 showing a motor vehicle equipped with a so-called "hands-free" access system according to the invention.

The vehicle V depicted in FIG. 2 is similar to the one depicted in FIG. 1 and for that reason elements which are identical or which fulfill the same role are denoted by the same reference numerals in FIGS. 1 and 2. The vehicle V depicted in FIG. 2 differs essentially from the one depicted in FIG. 1 in that the recognition device 1 is capable of powering the two antennas 2 and 3 with different electrical powers in response to action by a user on an external member of the vehicle. Said external member may, for example, be a door handle or pushbutton placed, for example, on the door handle to command the locking or unlocking at least of the lock associated with the door on which the door handle or pushbutton actuated by the user is located.

For example, when a user equipped with an identification member 11 approaches the vehicle from the driver side and pulls on the door handle 8 (or pushes an external button associated with said handle), this action on the handle is detected by the recognition device 1 which sends an interrogation signal to the identification member 11 via the antennas 2 and 3. This interrogation signal is emitted at nominal power via the antenna 3 located on the same side as the door 8 whose handle has been acted upon, so that the zone Z'2 covered by the antenna 3 is identical to the zone Z2 covered by the antenna 3 of the vehicle V of FIG. 1, that is to say that the zone Z'2 extends outside the vehicle V on both sides thereof, although to a greater extent on the driver side than on the passenger side. By contrast, the interrogation signal is emitted via the antenna 2 located on the opposite side to the door 8 whose handle has been acted upon, at a reduced power such that the zone Z'1 covered by the antenna 2 does not extend outside the vehicle V except on the side on which the antenna 2 is located, and then preferably by an amount such that the zone Z'1 completely encompasses the extension of the zone Z'2 on this same side of the vehicle V. As a preference, the recognition device 1 causes the interrogation signal to be emitted via the antenna 2 at reduced power with a brief time offset by comparison with the emission of the interrogation signal by the antenna 3 at nominal power.

When this is the case, if the identification member 11 is indeed located in the zone Z'2, it is placed on standby by the interrogation signal emitted by the antenna 3 and immediately responds to this interrogation signal by sending an encoded signal back to the recognition device 1. By contrast, if the identification member 11 is not in the zone Z'1, it cannot be placed on standby by the interrogation signal emitted by the antenna 2, which means that it does not react to this signal and that the recognition device 1 receives no signal in response to the signal emitted by the antenna 2. The recognition device 1 is therefore capable of determining by which of the two antennas the identification member 11 has been "seen", in this example, the antenna 3.

However, the identification member 11 may be outside or inside the vehicle V in the zone Z'2 (with the exclusion of the zone Z'1). However, there are known means of determining whether the user is inside the cabin of the vehicle V. These known means may, for example, be contact switches on the seat. If the driver's seat contact switch is not actuated, that means that the driver is not in his seat. Conversely, if the driver's seat contact switch is actuated, this means that the driver is in his seat. In consequence, if the recognition device 1 had received an encoded signal in response to the emitting of the interrogation signal by the antenna 3, it is capable, in conjunction with the information supplied for example by the seat contact switch, of determining whether the user wearing or carrying the identification member 11 is indeed outside the vehicle V, on the same side as the door 8, and if he is, it can, for example, command the unlocking of the doors of the vehicle V and possibly some other function, such as preheating the vehicle engine in the case of a diesel engine.

It will be noted that if it had been the handle of the door 6 which had been acted upon by the user, the recognition device 1 would then have sent the interrogation signal to the antennas 2 and 3 in turn, respectively powering them in such a way that the zone covered by the antenna 2 had the same extent as the zone Z1 of FIG. 1 and that the zone covered by the antenna 3 had a reduced extent like the zone Z'1 in FIG. 2. This being the case, the recognition device 1 would have been capable of determining whether an authorized user was indeed on the same side as the door 6 whose handle had been acted upon, and would have done so in a similar way to the way described above with regard to the scenario in which the handle of the door 8 had been acted upon by a user.

It goes without saying that the embodiment of the invention described hereinabove has been given by way of purely indicative and unlimiting example and that many modifications can be made by those skilled in the art without in any way departing from the scope of the invention.

What is claimed is:

1. A motor vehicle equipped with a recognition device (1) for operating means for locking the opening leaves (6–9) of the motor vehicle (V), said recognition device being capable of remotely exchanging data with an identification member (11) worn or carried by a user, to allow access to the vehicle when the identification member has been authenticated by the recognition device, the latter being connected to a pair of antennas (2, 3) placed one along each side of the vehicle and each having, when powered at nominal power, a zone of coverage (Z1, Z2) which covers the interior of the cabin of the vehicle and extends laterally to the outside at least on the side on which the antenna is located, so as to allow a dialog between the recognition device and the identification member when the latter is located in the zone of coverage of at least one of said antennas, the dialog being triggered in response to action by the user on an external member placed on one side of the vehicle, wherein the recognition device (1) is capable, in response to the action of the user on said external member, of causing the antenna located on the same side as said external member to be powered at said nominal power and the antenna located on the opposite side of the vehicle to be powered at a reduced power so that the latter antenna has a reduced zone of coverage (Z'1) extending toward the outside of the vehicle only on said side opposite the one on which this antenna is located, so that the recognition device (1) is capable of determining on which side of the vehicle the identification member (11) has been seen by one or other of the two antennas (2, 3), so as to carry out at least one function dependent on the side of the vehicle on which the identification member has been seen.

2. The vehicle as claimed in claim 1, wherein the powering of one of the two antennas (2, 3) at nominal power and the powering of the other antenna at reduced power are offset in time.

3. The vehicle as claimed in claim 1, wherein said pair of antennas (2, 3) is placed approximately in the middle of the sides of the vehicle (V).

4. The vehicle as claimed in claim 3, wherein said pair of antennas (2, 3) is installed in the door handles or in the B-pillars (4, 5) of the vehicle bodywork.

5. The vehicle as claimed in claim 1, wherein said external member is an external door handle or pushbutton.

* * * * *